(12) United States Patent
Flath et al.

(10) Patent No.: US 7,555,143 B2
(45) Date of Patent: Jun. 30, 2009

(54) REAL-TIME GEO-REGISTRATION OF IMAGERY USING COTS GRAPHICS PROCESSORS

(75) Inventors: Laurence M. Flath, Livermore, CA (US); Michael W. Kartz, Tracy, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 733 days.

(21) Appl. No.: 11/350,672

(22) Filed: Feb. 8, 2006

(65) Prior Publication Data

US 2006/0197837 A1    Sep. 7, 2006

Related U.S. Application Data

(60) Provisional application No. 60/651,839, filed on Feb. 9, 2005.

(51) Int. Cl.
*G06K 9/00* (2006.01)
*H04N 7/18* (2006.01)

(52) U.S. Cl. .................................... 382/109; 348/143

(58) Field of Classification Search ......... 382/106–109, 382/154, 284–285, 289, 293–298, 300; 345/421, 345/581–582, 615, 620, 629–630, 634, 648–936; 348/42–43, 47, 51, 55, 135, 143–144, 154; 356/2; 358/537–540; 396/7–13
See application file for complete search history.

(56) References Cited

U.S. PATENT DOCUMENTS

| 6,226,418 | B1 |   | 5/2001 | Miller et al. |
| 6,384,859 | B1 | * | 5/2002 | Matsumoto et al. ........... 348/43 |
| 6,512,857 | B1 |   | 1/2003 | Hsu et al. |
| 6,587,601 | B1 |   | 7/2003 | Hsu et al. |
| 6,597,818 | B2 |   | 7/2003 | Kumar et al. |
| 6,757,445 | B1 | * | 6/2004 | Knopp ....................... 382/285 |
| 2001/0038718 | A1 |   | 11/2001 | Kumar et al. |
| 2003/0014224 | A1 |   | 1/2003 | Guo et al. |

OTHER PUBLICATIONS

Anonymous, "Workshop Program" ACM Workshop on General Purpose Computing on GPUS, Aug. 2004, Online Nov. 19, 2004, Los Angeles, CA, USA.
Beaven S G et al, "Joint Multisensor Exploitation for Mine Detection" Proceedings of the Spie—The International Society for Optical Engineering Spie—(cont'd).

(Continued)

*Primary Examiner*—Samir A. Ahmed
*Assistant Examiner*—Mehdi Rashidian
(74) *Attorney, Agent, or Firm*—James S. Tak; John H. Lee

(57) ABSTRACT

A method of performing real-time geo-registration of high-resolution digital imagery using existing graphics processing units (GPUs) already found in current personal computers, rather than the main central processing unit (CPU). Digital image data captured by a camera (along with inertial navigation system (INS) data associated with the image data) is transferred to and processed by the GPU to perform the calculations involved in transforming the captured image into a geo-rectified, nadir-looking image. By using the GPU, the order-of-magnitude increase in throughput over conventional software techniques makes real-time geo-registration possible without the significant cost of custom hardware solutions.

16 Claims, 14 Drawing Sheets

OTHER PUBLICATIONS

Int. Soc. Opt. Eng USA2004, vol. 5415, No. 1, pp. 1094-1105.

Laurence Flath, "Utilizing Commericial Graphics Processors in the Real-time Geo-registration of Streaming High-resolution Imagery" ACM Workshop on General Purpose (cont'd).

Computing on GPUS, Aug. 2004, Online Nov. 19, 2004, Los Angeles, CA, USA.

Daniela Poli; "Indirect Georeferencing of Airborne Multi-Line Array Sensors: A Simulated Case Study" Proceedings ofISPRS Commission III Symposium Photogrammetric Computer Vision "02" Graz, Austria, Sep. 9-13, 2002 vol. 34, Part B3/A pp. 246-251.

Changno Lee et al "Rigorous Mathematical Modeling of Airborne Hyperspectral Imaging System" Purdue University, USA.

Daniel Schlapfer et al "PARGE: Parametric Geocoding Based on GCP-Calibrated Auxiliary Data" Imaging spectrometry IV, San Diego, 1998 SPIE 3438: 334-344.

Helge Wegmann "Image Orientation by combined (A)AT with GPS and IMU" Institute for Photogrammetry and Geoinformation, University of hannover, Nienburger Str. 1 30167 Hannover Germany.

Daniel Schlapfer et al A Unified Approach to parametric Geocoding and Atmospheric/Topographic Correction for wide FOV Airborne Imagery Part 1: Parametric Otho-rectification process.

* cited by examiner

```
// Calculations
grMatrix[0] = - D / camera.lensFocalLength;                                    // x-component
grMatrix[5] = (Z - (G2 / Z)) / camera.lensFocalLength;                         // y-component
grMatrix[7] = G / (Z * camera.lensFocalLength);                                // w-component // View space
glViewport(0, 0, viewSize.width, viewSize.height);
glClear(GL_COLOR_BUFFER_BIT);
glMatrixMode(GL_PROJECTION);
glLoadIdentity();
orthoSizeX = 0.5 * groundResolution * viewSize.width;
orthoSizeY = 0.5 * groundResolution * viewSize.height;
glOrtho(orthoSizeX, -orthoSizeX, -orthoSizeY, orthoSizeY, -1, 1);              // Scale to desired output resolution // Model space
glMatrixMode(GL_MODELVIEW);
glLoadIdentity();
glRotated(-H * CONST_180_OVER_PI, 0, 0, 1);                                    // Adjust for heading
glMultMatrixd(grMatrix);                                                       // Geo-rectify
glRotated(-R * CONST_180_OVER_PI, 0, 0, 1);                                    // Remove roll
glScaled(-camera.frameSize.width * camera.pixelSize.width,
         -camera.frameSize.height * camera.pixelSize.height, 1.0);             // Fix units
glBegin(GL_QUADS);                                                             // Texture map
   sqSize = 0.5;
   glColor3f(1.0, 1.0, 1.0);
   glTexCoord2f(0.0, 0.0);      glVertex2f(-sqSize,  sqSize);
   glTexCoord2f(0.0, 1.0);      glVertex2f(-sqSize, -sqSize);
   glTexCoord2f(1.0, 1.0);      glVertex2f( sqSize, -sqSize);
   glTexCoord2f(1.0, 0.0);      glVertex2f( sqSize,  sqSize);
glEnd();

// Reset color and flush code down the GL pipeline
glColor4f(1.0, 1.0, 1.0, 1.0);
glFlush();
```

Figure 8

REAL-TIME GEO-REGISTRATION OF IMAGERY USING COTS GRAPHICS PROCESSORS

I. CLAIM OF PRIORITY IN PROVISIONAL APPLICATION

This application claims the benefit of U.S. provisional application No. 60/651,839 filed Feb. 9, 2005, entitled, "Real-Time Geo-Registration of Imagery Using Commercial Off-the-Shelf Graphics Processors" by Laurence M. Flath et al.

The United States Government has rights in this invention pursuant to Contract No. W-7405-ENG-48 between the United States Department of Energy and the University of California for the operation of Lawrence Livermore National Laboratory.

II. FIELD OF THE INVENTION

The present invention relates to geo-registration methods, and more particularly relates to a method of performing real-time geo-registration of high-resolution digital imagery using existing graphics processing units (GPUs) already available with current personal computers.

III. BACKGROUND OF THE INVENTION

A wide range of sensor technologies (visible, infrared, radar, etc.) and a wide variety of platforms (mountaintops, aircraft, satellite, etc) are currently used to obtain imagery of planetary surfaces. Geo-registration is the process of mapping imagery obtained from such various sources into predetermined planetary coordinates and conditions, i.e. calibrating/correlating such image data to the real world so as to enable, for example, the determination of absolute positions (e.g. GPS (global positioning system) coordinates), distances, etc. of features found in the image. However, in order to overlay the images from the various types of cameras (sensor fusion), the image data from all of the disparate sources must first be modified into a common coordinate system. Geo-rectification is the process of converting or otherwise transforming an image (e.g. an off-axis image) recorded from an arbitrary position and camera orientation, into one that appears as a nadir view, i.e. a view from directly above the scene/object/features of interest looking straight down, as at a map. Geo-rectification thus enables various images to share the same orthogonal perspective so that they can be geo-registered and correlated to/against each other or a reference image.

Image processing, however, is often computationally expensive; the number of image processing computations necessary to perform geo-rectification of off-axis high-resolution images is typically very large even for small source images, requiring significant computational resources and making real-time visualization of live data difficult. Real-time image data processing is therefore typically managed as a trade off between image size (number of pixels) and data rate (frames per second).

Current techniques for fast image rendering and geo-registration either employ software only for post processing of data, or require expensive custom hardware i.e. dedicated pixel processors, even for relatively low-resolution source data. Software-only techniques, for example, can perform the image transformation calculations necessary for geo-registration on the central processing unit (CPU) of a computer or workstation. Due to inadequate memory bandwidth, however, these methods typically take 2-3 seconds per mega-pixel of image data, even with currently available high-end workstations preventing such software only methods from performing in real-time.

And the custom hardware approach typically utilizes dedicated pixel processors, which are specially designed graphics cards (printed circuit boards) and software capable of high throughputs which enable real-time performance of image transformations and geo-registration. For example, one particular custom hardware/dedicated pixel processor for performing real time geo-registration, known as Acadia™, is commercially available from Sarnoff/Pyramid Vision Technologies. This representative custom device, however, operates at a low resolution with RS-170 quality video, which is ~640×480 pixels at 30 Hz Moreover, there is a high cost for such custom hardware and the programming time to custom-configure such hardware. For example, such custom dedicated pixel processors typically cost in the tens of thousands of dollars for the hardware alone, and an additional cost ranging up to $100K for the configuration of the software.

What is needed therefore is a digital image processing methodology for performing geo-registration that is faster (real time streaming), more cost effective, and with higher resolution than software-only techniques or the use of expensive custom hardware/dedicated pixel processors.

IV. SUMMARY OF THE INVENTION

One aspect of the present invention includes a geo-registration method comprising: obtaining digital image data of an image source using a camera located a distance D from a center field of view (CFOV) of the image source, where f is the focal length of a lens of the camera and D>>f; obtaining inertial navigation system (INS) data of the camera associated with the digital image data, said INS data including camera position data and camera attitude data including roll, pitch, and heading; loading the digital image data into a GPU of a computer system to be processed thereby; in the GPU of the computer system: calculating relative angles and distances between the camera and the image source from said INS data; performing geometry correction of the digital image data using the calculated relative angles and distances; performing geo-rectification of the geometrically corrected digital image data using an affine homogenous coordinate transformation, to produce a geo-rectified digital image data; performing a rotation transformation about a z-axis of the geo-rectified digital image data to remove $\alpha_{heading}$; and performing geo-registration with the heading-adjusted and geo-rectified digital image data.

Another aspect of the present invention includes an article of manufacture comprising: a computer usable medium having computer readable program code means embodied therein for geo-registering digital image data of an image source using a GPU of a computer, said digital image data obtained using a camera located a distance D from a center field of view (CFOV) of the image source, where f is the focal length of a lens of the camera and D>>f, and said digital image data associated with inertial navigation system (INS) data of the camera including camera position data and camera attitude data, the computer readable program code means in said article of manufacture comprising: computer readable program code means for causing the GPU to calculate relative angles and distances between the camera and the image source from said INS data; computer readable program code means for causing the GPU to perform geometry correction of the digital image data using the calculated relative angles and distances; computer readable program code means for causing the GPU to perform geo-rectification of the geometrically corrected digital image data using an affine homogenous coordinate transformation, to produce a geo-rectified digital image data; computer readable program code means for causing the GPU to perform a rotation transformation about a z-axis of the geo-rectified digital image data to remove $\alpha_{heading}$; and computer readable program code means for causing the GPU to perform geo-registration with the heading-adjusted and geo-rectified digital image data.

The present invention is directed to a geo-registration method for performing transformations of high-resolution digital imagery that operates in real time, is faster and typically produces higher resolution images than software only or custom hardware/dedicated pixel processor techniques, and is less expensive than such existing techniques by using commercial off-the-shelf (COTS) image processing hardware already found in most current personal computers (PCs). In particular, the method and system of the invention performs image transformations using a COTS graphics processing unit (GPU) typically found in a conventional PC rather than the main central processing unit (CPU) of the computer as is often done with existing geo-registration technology. Personal computers with graphics cards typically cost less than $3K.

V. BRIEF DESCRIPTION OF THE DRAWINGS

The accompanying drawings, which are incorporated into and form a part of the disclosure, are as follows:

FIG. 8 is a code snippet of exemplary source code of the method of the present invention.

VI. DETAILED DESCRIPTION

A. Theory of Geo-registration

Figure 1:
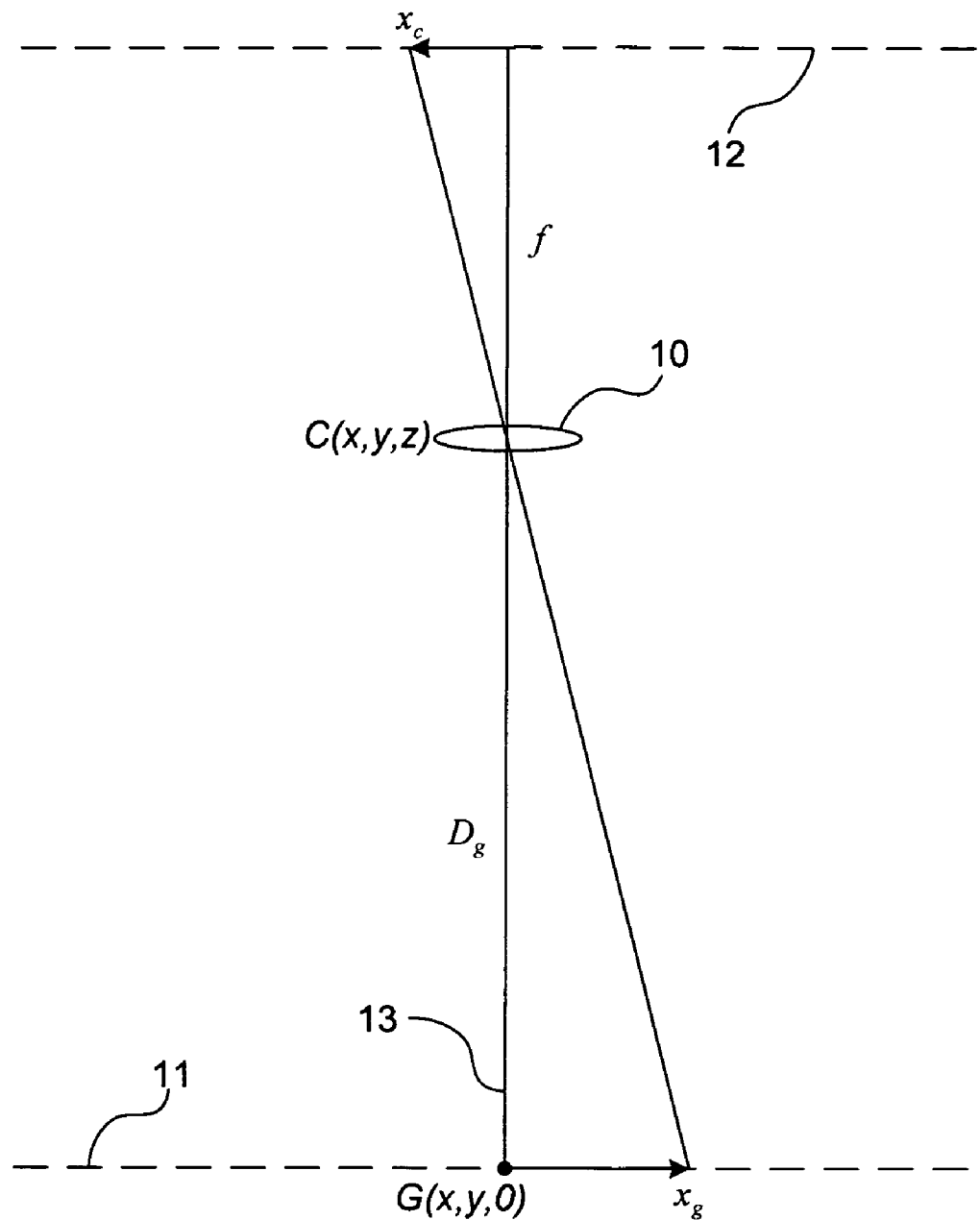
FIG. 1 is a schematic illustration of first-order transverse imaging.

In order to describe the geometric transformations involved in geo-rectification, FIG. 1 shows the simple case of first-order transverse imaging of a planar object surface that is perpendicular to the optical axis, onto the real image plane of a camera. In particular, FIG. 1 shows a camera system, represented by lens 10, located at a position C(x, y, z) in space, and staring in a nadir-looking direction along an optical axis 13 at a point G(x, y, 0) on the ground plane 11. The distance of the optical axis 13 between the lens 10 and the point G of the planar object is shown as $D_g$. If the focal length of the lens is f, and the distance between the lens 10 and a real image plane is $D_c$ (not shown), then the thin lens equation is:

$$\frac{1}{f} = \frac{1}{D_c} + \frac{1}{D_g} \quad (1)$$

Furthermore, if we assume a perfect thin lens (i.e. neglecting the effects of optical aberrations) and assume that $D_g \gg f$, then the real image distance $D_c$ is approximately equal to the focal length f as follows:

$$\frac{1}{f} = \frac{1}{D_c} + \frac{1}{D_g} \Rightarrow D_c = \frac{fD_g}{f+D_g} \approx f, \text{ for } D_g \gg f \quad (2)$$

As such, the real image plane and the focal plane are considered the same (shown at reference character 12), and ground objects are projected as a real image on the focal plane. As used herein and in the claims, the image plane and focal plane are therefore treated as equivalents and used interchangeably. In this manner, ground objects along the $x_g$-axis are projected onto the camera's focal plane 12 in first-order fashion, and is identical to the setup and operation of an ideal pinhole camera. Based on this approximation, a similar-triangle relationship is obtained, as shown in FIG. 1, between objects and images on the x-axis. This is expressed as:

$$\frac{x_c}{f} = -\frac{x_g}{D_g}. \quad (3)$$

where $x_g$ is the dimension of an object in the $x_g$-axis of the ground plane, and $x_c$ is the corresponding dimension of the image projection in the $x_c$-axis of the focal plane 12.

In contrast to the example of FIG. 1, a more general imaging scenario may be considered of a remote mobile camera system imaging a ground plane at an oblique ("off-axis") angle (see FIGS. 2-5). Generally, several quantities define the projection of the off-axis ground plane to the camera focal plane. The first three quantities are the relative position (X, Y, Z) of the camera with respect to the center field of view (CFOV). In aviation parlance, X, Y, and Z are the relative longitude, latitude, and altitude, respectively. The next three quantities involve the camera orientation or attitude, which include the camera rotation angles corresponding to heading ($\alpha_{heading}$), pitch ($\alpha_{pitch}$), and roll ($\alpha_{roll}$). It is appreciated that $\alpha_{heading}$ is characterized as the angular deviation from a reference direction (e.g. North) due to rotation about a Z-axis orthogonal to the X-Y ground plane, $\alpha_{pitch}$ is the angle the optical axis makes with the X-Y ground plane, and $\alpha_{roll}$ is the angular deviation of the camera from a reference direction due to rotation about the optical axis. And lastly, optical system characteristics, such as the lens focal length, f, the focal plane array (FPA) size, and FPA pixel pitch determine the magnification of the camera's optical system. It is appreciated that images captured by the camera will be uniquely associated with the camera positions and attitudes at the time of image acquisition.

It is notable that since it is impossible to map an arbitrary 3-D surface onto a 2-D image plane without distortion, many types of planetary-scale projections exist to prioritize a particular property. For example, Mercator gives straight meridians and parallels, Azimuthal-Equidistant gives equal areas, etc. All such projections require a 'warping' of the source data and are, at best, an approximation of reality. However, for the imaging applications considered here involving mapping a localized area, the earth's curvature can essentially be ignored. As such, the transforming of imagery from a recorded first perspective into another for geo-registration is possible with only the position and orientation/attitude information of the sensor (i.e. camera) platform. To this end, a global positioning system (GPS) locator is typically used to provide the camera position data (accurate to better than a few meters) anywhere on the globe, and inertial measurement hardware (i.e. inertial measurement unit, "IMUs") known in the art, is used to provide the camera attitude, e.g. roll, pitch, and heading. Together the GPS and IMU is characterized as an inertial navigation system, "INS".

Figure 11:
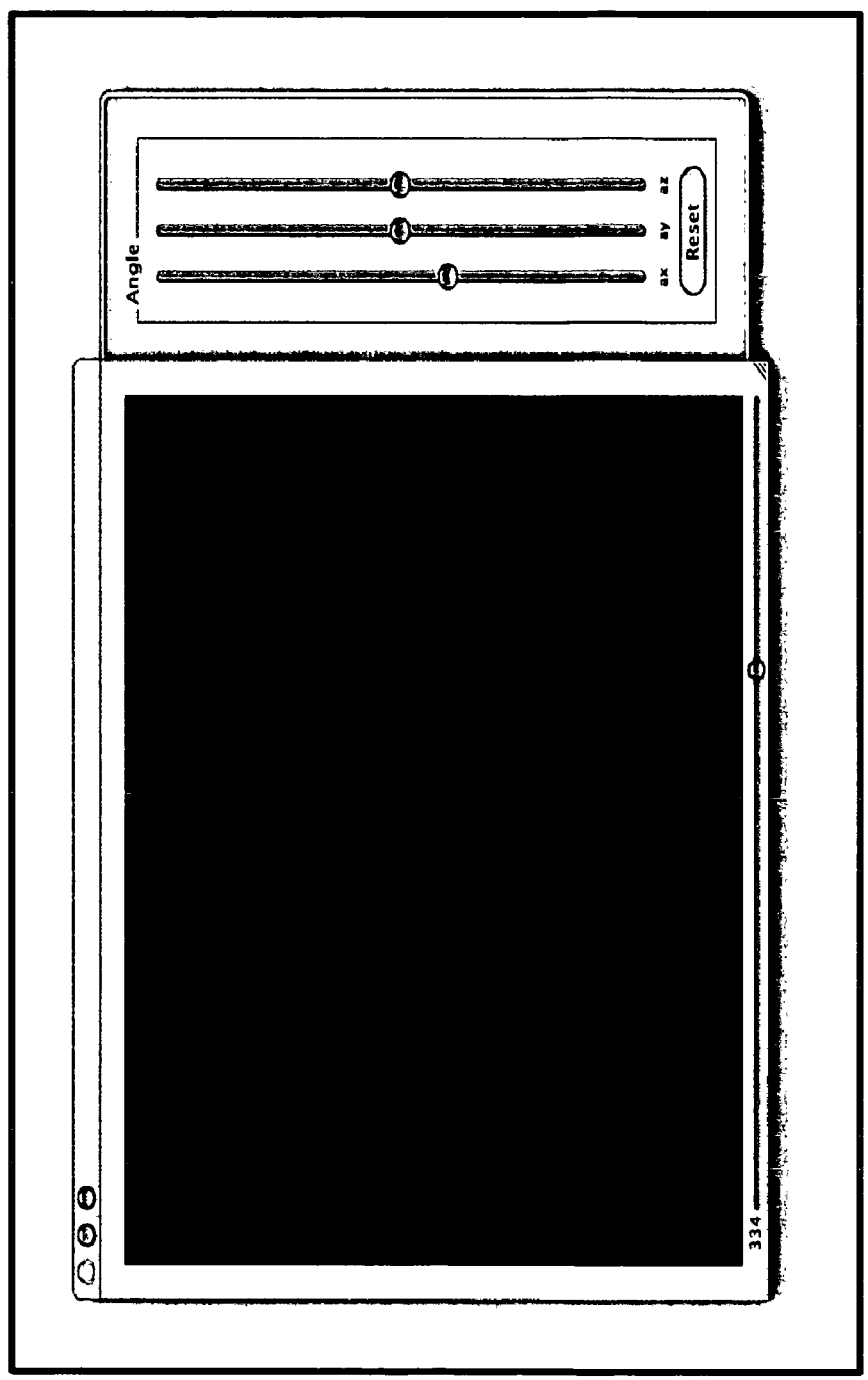
FIG. 11 is a screen shot of an "Experiment View" mode of an exemplary embodiment of the present invention using INS data and camera/lens characteristics to recreate the flight pattern of an aircraft carrying a camera system used in the present invention.
Figure 12:
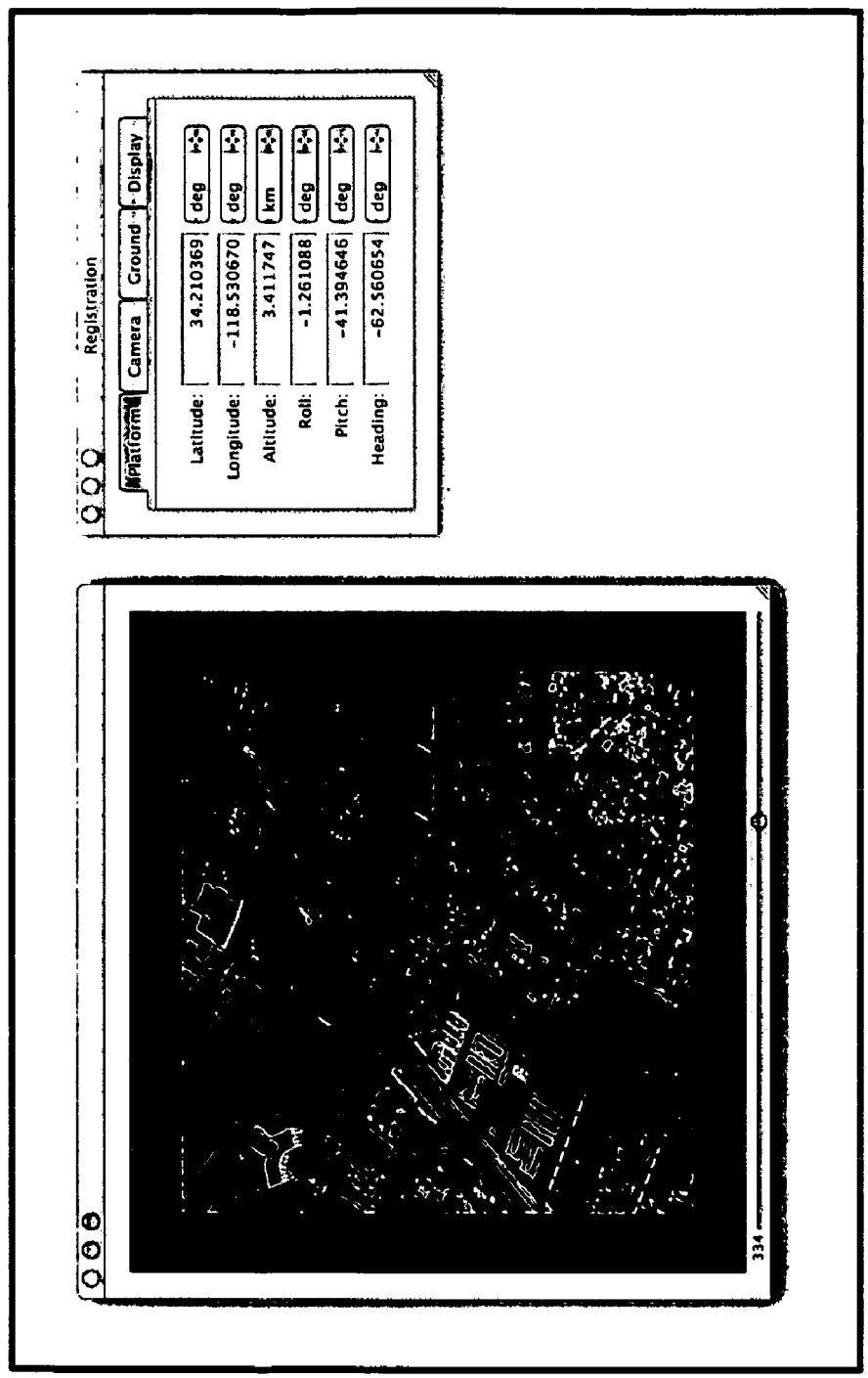
FIG. 12 is a screen shot of a source image prior to geo-registration using an exemplary embodiment of the present invention.

In the general imaging scenario, camera roll ($\alpha_{roll}$) about the optical axis will cause the off-axis projected image to appear as an asymmetric quadrilateral, making direct calculations of the corner positions rather involved. The problem can be simplified by performing two basic coordinate transformations. First, by viewing along a ground line from the camera's position to the CFOV, the relative positions X and Y of camera the can be reduced to a single quantity G (where G= $\sqrt{X^2+Y^2}$), and the three camera orientation angles ($\alpha_{heading}$, $\alpha_{pitch}$, $\alpha_{roll}$) are also reduced to a single pitch angle, $\alpha_{pitch}$. Second, by rotating the image to remove the roll component, $\alpha_{roll}$, rectangular ground regions map to a symmetrical trapezoidal areas on the camera focal plane, and vice-versa (where symmetrical trapezoidal ground regions map to a rectangular area on the camera focal plane, as shown in FIGS. 11 and 12). Deriving the relationship between the ground and the camera focal plane then becomes straightforward geometry, and geo-rectification may be subsequently performed.

Figure 2:
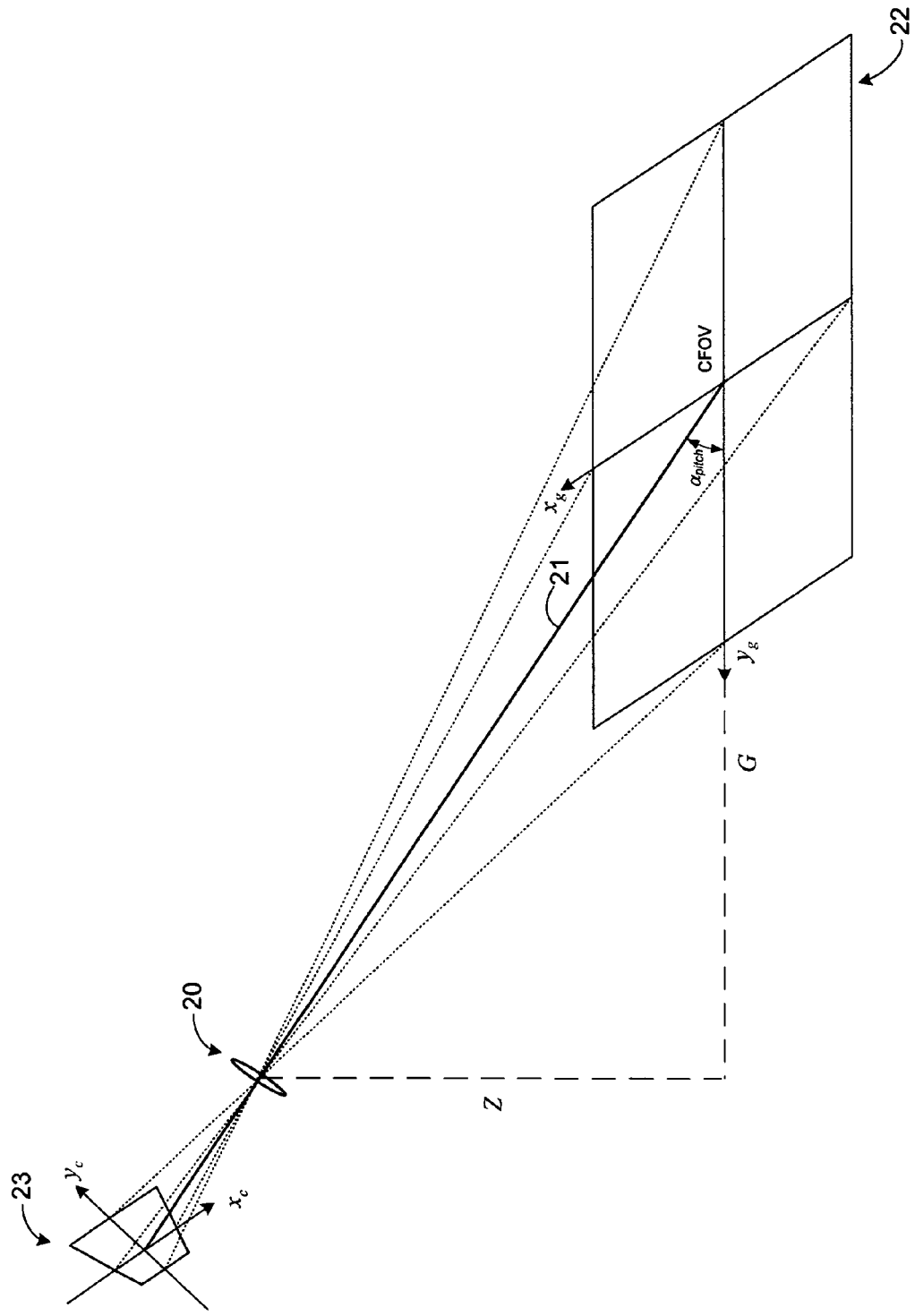
FIG. 2 is a schematic perspective view of an exemplary camera system imaging the ground from a remote camera platform at an off-axis angle.
Figure 3:
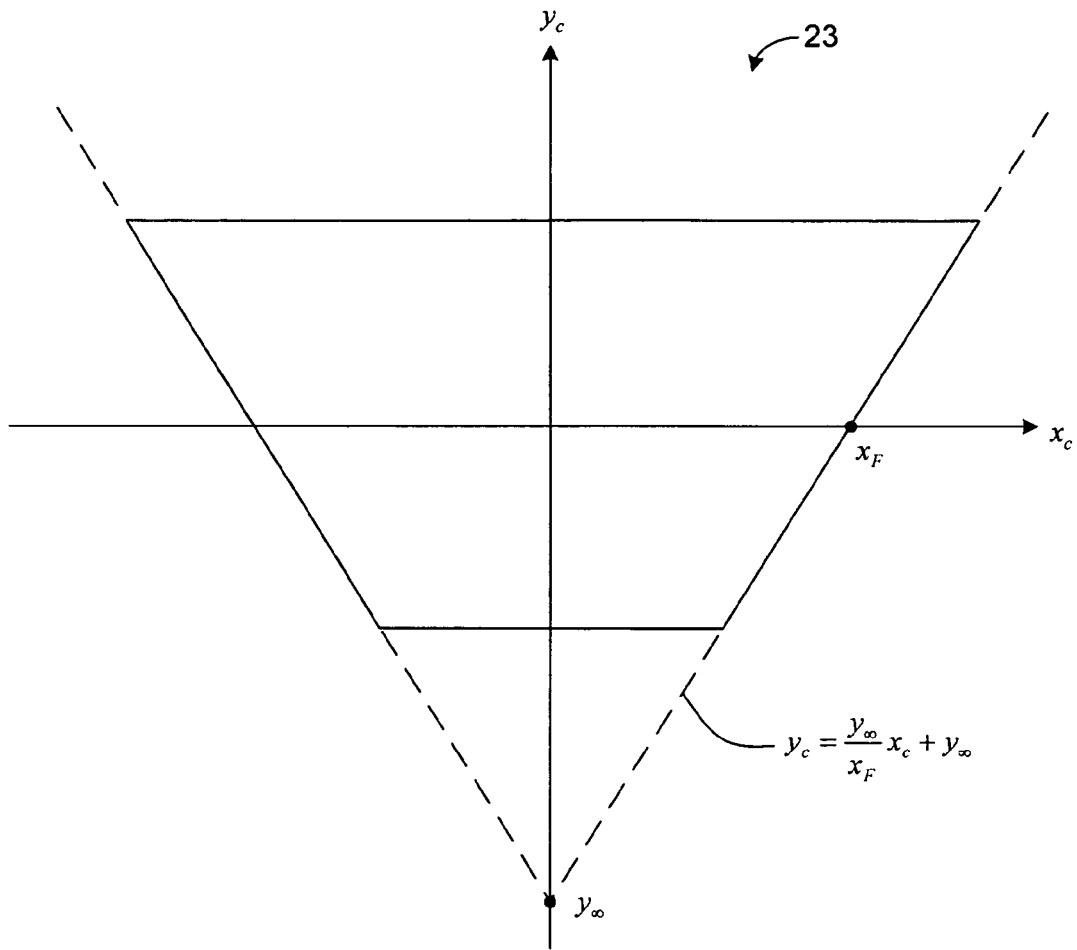
FIG. 3 is an enlarged schematic view of an image of the rectangular ground patch of FIG. 2 that is projected onto the camera's focal plane for non-zero $\alpha_{pitch}$.

FIGS. 2-5 illustrate the simplified general imaging scenario described above with the coordinate transformation on G and the rotational transformation on $\alpha_{roll}$ already made. As such, FIG. 2 shows the image source as a rectangular patch 22 of the ground plane, and FIG. 3 shows the projected image 23 as a symmetrical trapezoidal area. The remote system camera is represented as lens 20 located at an altitude Z from the ground plane, and a distance G from the CFOV as viewed along a ground line. The optical axis 21 of the camera is oblique to the rectangular patch 22 at a pitch angle $\alpha_{pitch}$ to intersect the rectangular patch 22 at the CFOV. The distance between the lens 20 and the CFOV is labeled D in FIGS. 4 and 5, and the projected image of the rectangular patch 22 onto the real image plane is indicated at reference character 23 in FIGS. 2 and 3. Similar to the discussion of FIG. 1, here too the optical imaging system is treated like a pinhole camera, i.e. Z, G>>f.

FIG. 3 shows an enlarged view of the projected image 23 of the rectangular ground patch on the camera's focal plane for non-zero $\alpha_{pitch}$. Because of the perspective effect, objects closer to the camera appear larger than those that are far away. Therefore, assuming a point on the ground having coordinates ($x_g$, $y_g$) is projected onto the focal plane at coordinates ($x_c$, $y_c$), the coordinate transformation from $x_g$ into $x_c$ is not necessarily the same as from $y_g$ into $y_c$. In particular, the projected $x_c$ coordinate will be dependent on both the $x_g$ and $y_g$ ground coordinates (due to the perspective effect), whereas the projected $y_c$ coordinate will be dependent only on the $y_g$ ground coordinate since all points for a given $y_g$ on the ground map onto the same $y_c$ line on the focal plane, regardless of the $x_g$ ground coordinate. The simplest means to derive this relationship is to note that the camera has a single-point perspective of the scene, as shown in FIG. 3. The equation of a line drawn through the single-point is:

$$y_c = \frac{y_\infty}{x_F} x_c + y_\infty. \tag{4}$$

where $x_F$ is the $x_c$-intercept of the Equation (3), and $y_\infty$ represents the point where all object points at an infinite distance will image.

To relate the ground x-coordinate ($x_g$) of the ground patch 22 to the camera image plane coordinates ($x_c$), and the ground y-coordinate ($y_g$) of the ground patch to the camera image plane coordinates ($y_c$), the quantities $y_\infty$ and $x_F$ are computed. In particular, $x_F$ is computed using equation (3) as follows.

$$x_F = -\frac{f}{D} x_g, \tag{5}$$

Figure 4:
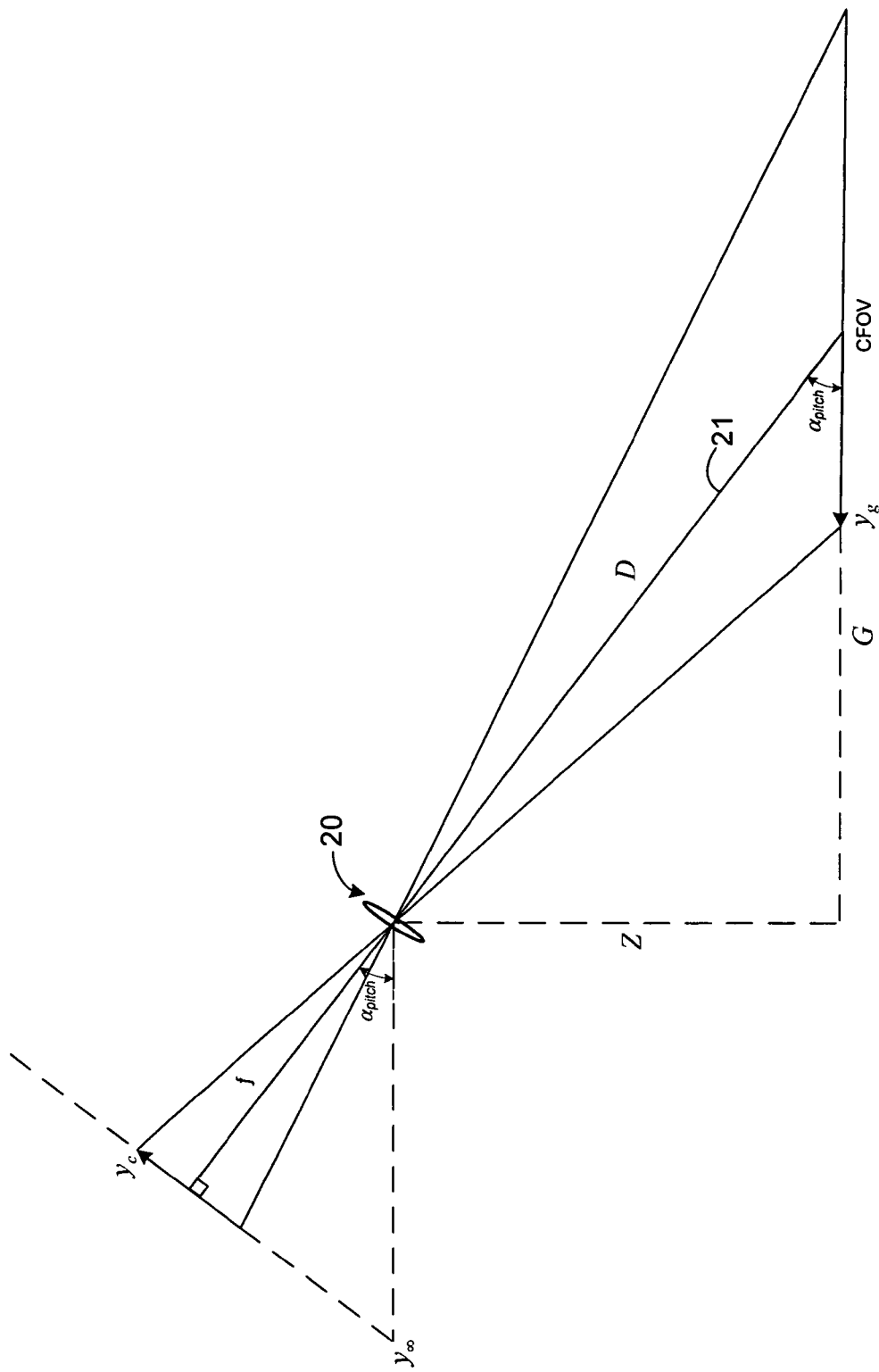
FIG. 4 is a schematic side view of the arrangement shown in FIG. 2 illustrating the mapping of y-coordinates from ground to camera focal plane.

And $y_\infty$ is computed using the trigonometric arrangement illustrated in FIG. 4, as follows:

$$y_\infty = -f \tan \alpha_{pitch} = -f \frac{Z}{G}. \tag{6}$$

Substituting Equations (5) and (6) into the Equation (4):

$$y_c = \frac{y_\infty}{x_F} x_c + y_\infty = \frac{D}{x_g} \frac{Z}{G} x_c - f \frac{Z}{G}. \tag{7}$$

and rearranging gives the transformation equation between $x_g$ and $x_c$:

$$x_g = \frac{\left(\frac{D}{f}\right) x_c}{\left(\frac{G}{Zf}\right) y_c - 1}. \tag{8}$$

Similarly, the ground y-coordinate ($y_g$) is calculated as it relates to the y-coordinate ($y_c$) of the camera focal plane using the trigonometric arrangement illustrated in FIG. 5, as follows:

$$\sin\alpha_{pitch} = \frac{y_\perp}{y_g} \Rightarrow y_\perp = y_g \sin\alpha_{pitch}, \quad (9)$$

$$\cos\alpha_{pitch} = \frac{D - D_\perp}{y_g} \Rightarrow D_\perp = D - y_g \cos\alpha_{pitch}. \quad (10)$$

Substituting equations (9) and (10) into a similar-triangle equation similar to equation (3):

$$\frac{y_c}{f} = -\frac{y_\perp}{D_\perp} = \frac{y_g\left(\frac{Z}{D}\right)}{y_g\left(\frac{G}{D}\right) - D}. \quad (11)$$

And rearranging gives:

$$y_g = \frac{\left(\frac{D^2}{Zf}\right) y_c}{\left(\frac{G}{Zf}\right) y_c - 1}. \quad (12)$$

Figure 5:
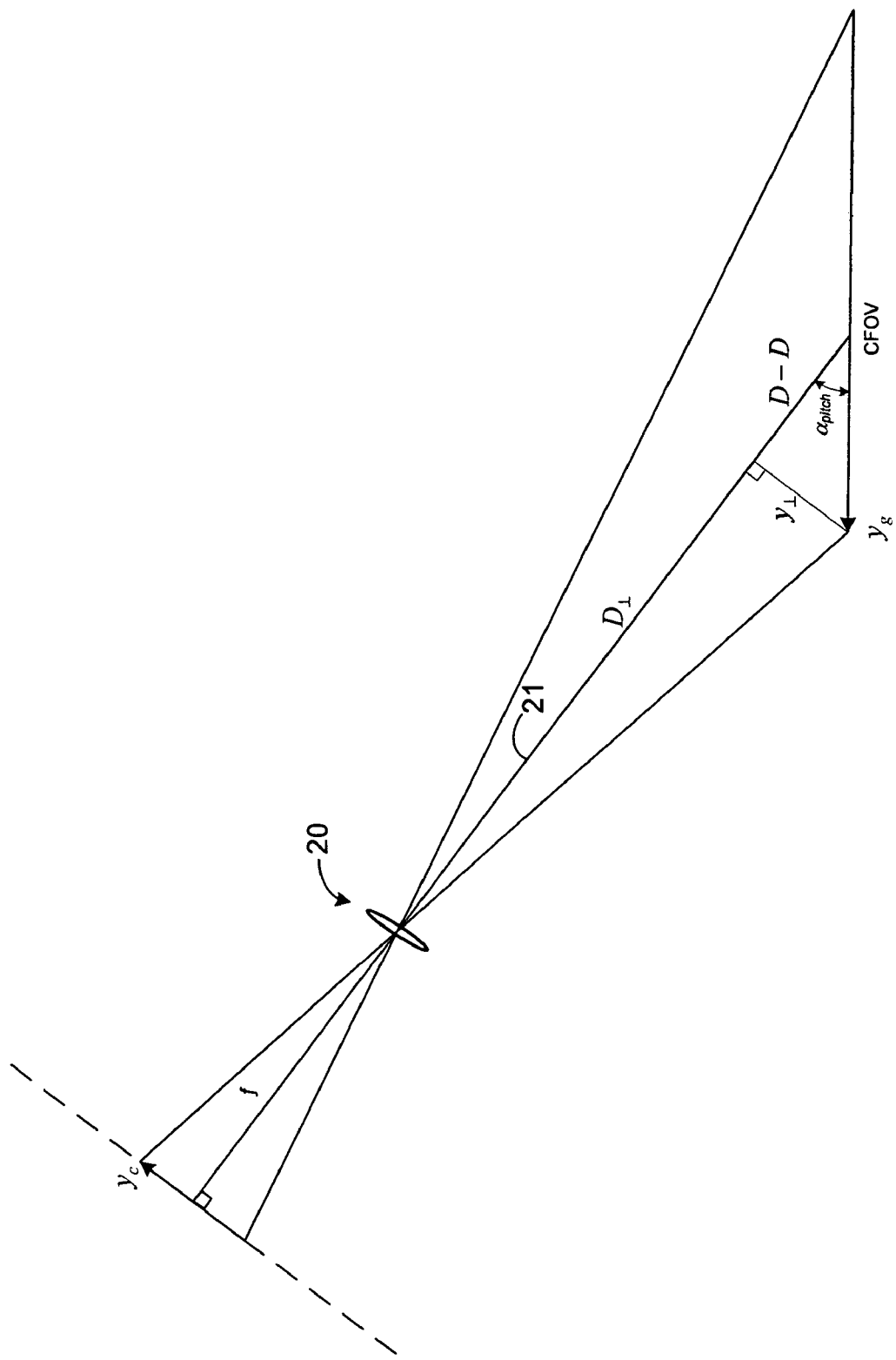
FIG. 5 is a schematic side view of the arrangement shown in FIG. 4 illustrating the trigonometric relationship for relating $y_g$ in terms of $y_c$.

It is notable that the $-y_g/+y_c$ set of triangles in FIG. 5 was chosen for ease of description; a derivation using the $+y_g/-y_c$ set of triangles is slightly more involved, but yields the same result.

B. COTS Graphics Processing Units (GPUs)

Figure 13:
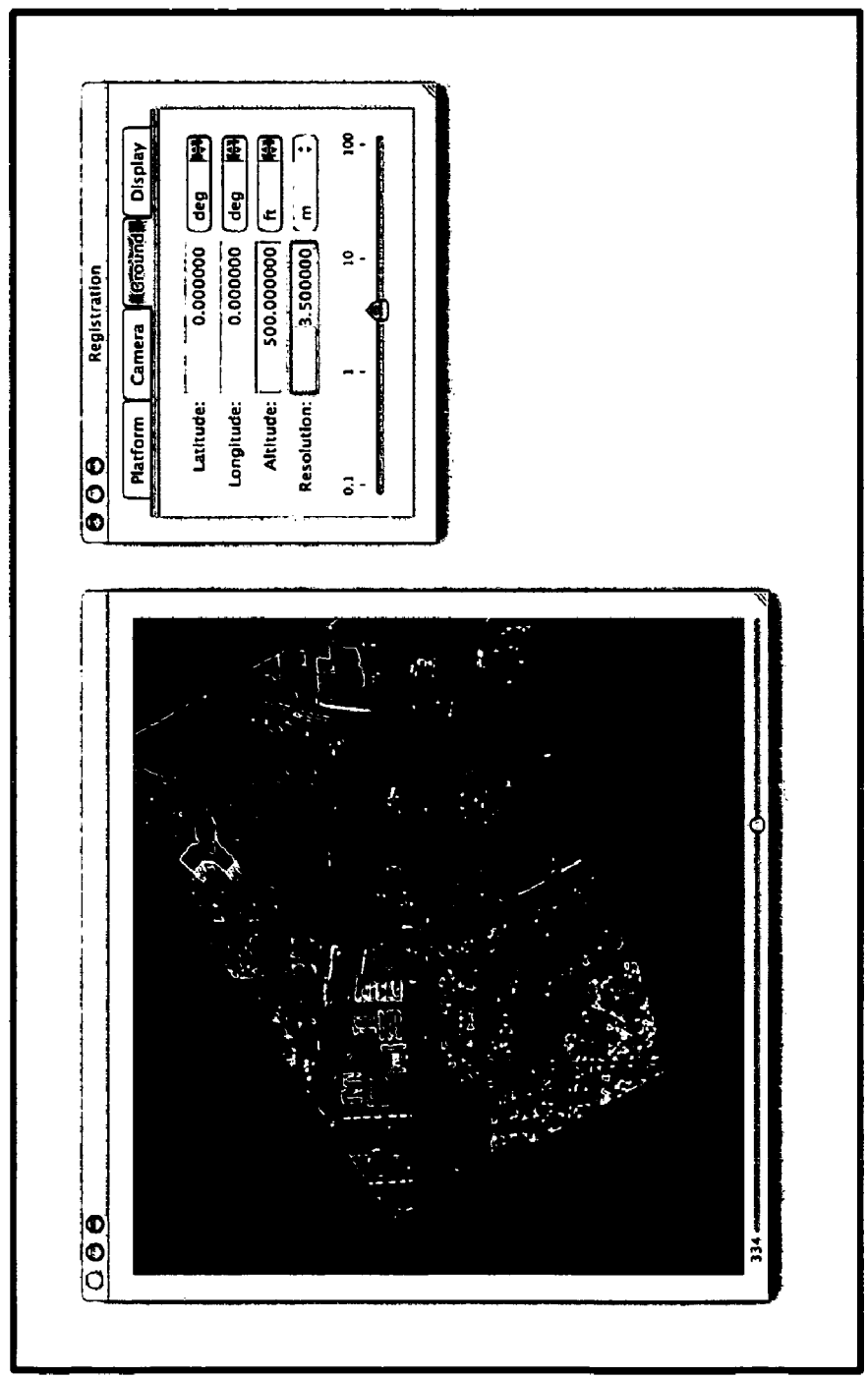
FIG. 13 is a screen shot of the source image of FIG. 11, after performing geo-rectification and geo-registration with an exemplary embodiment of the present invention.
Figure 14:
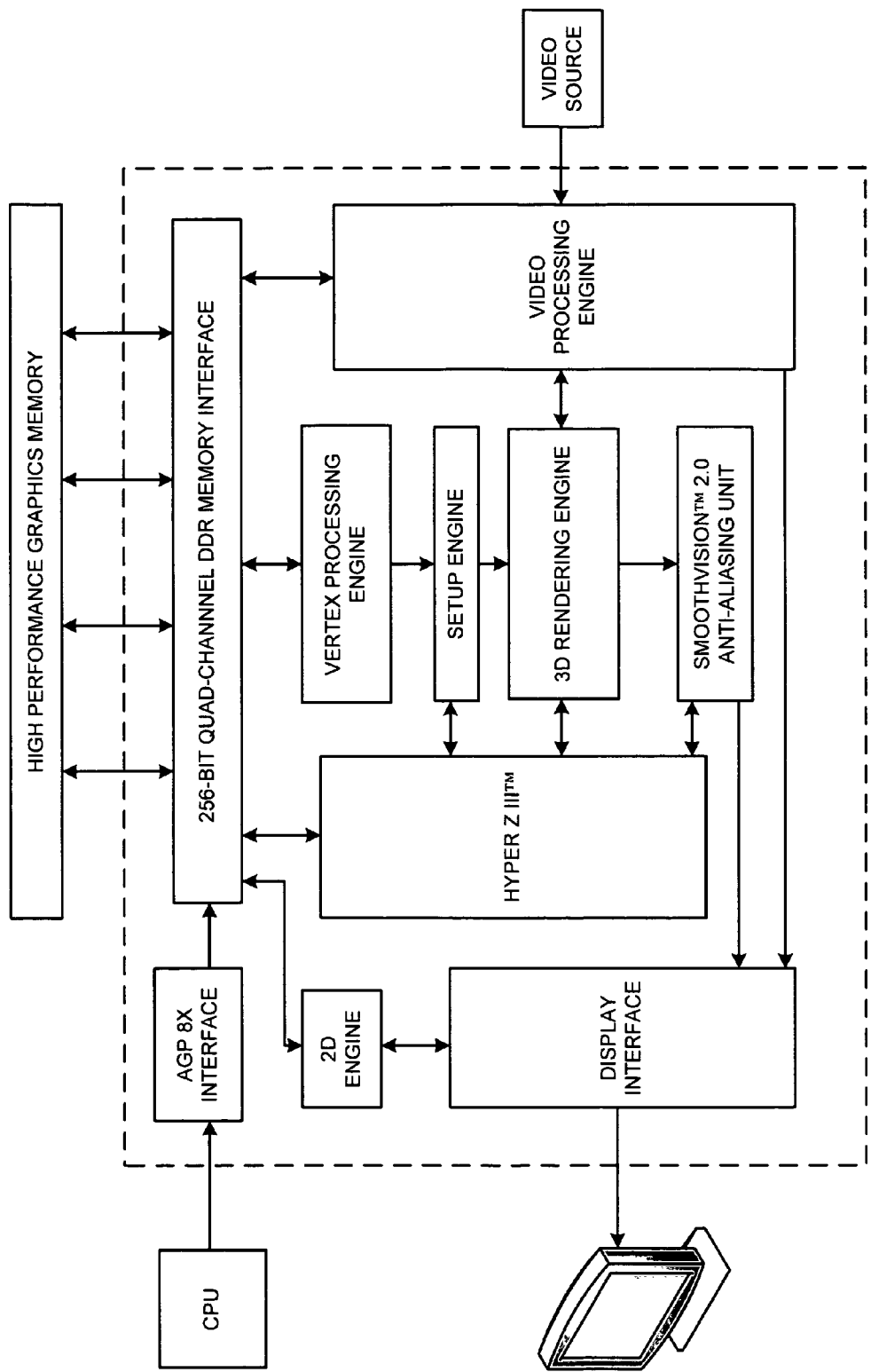
FIG. 14 is a schematic illustration of the Radeon™ 9700 video card, a representative GPU known in the prior art.

The graphics subsystems in currently available personal computers are designed to rapidly perform 3-D calculations of extremely complex scenes in real-time, and are especially well-suited for performing perspective transformations like those in Equations 8 and 12. Mostly due to demand by the gaming industry, the GPUs found on the top-of-the-line video cards, such as for example ATI™, nVidia™, and Intel™, contain more transistors than the main CPU of a PC, and utilize the same state-of-the-art semiconductor fabrication/design rules. When perspective calculations are performed on a general-purpose CPU, the division and square-root operators are the most time-consuming and temporally non-deterministic computations, not to mention the possibility of a divide-by-zero exception, which would halt the process. This is not the case with GPUs, which are specifically designed for performing complex arithmetic operators such as inverse square root, clamping, and homogeneous coordinates, as well as employing affine transformations for shift, scale, rotation, and shear, and point operators for value scaling. FIG. 13 shows a schematic illustration of the Radeon™ 9700 video card commercially available from ATI Technologies, Inc. (Ontario, Canada), illustrating some of the many sophisticated data processing components and functions available in COTS GPUs.

It is appreciated that GPUs can be an adapter, i.e. a removable expansion card in the PC, or can be an integrated part of the system board. Basic components of a GPU include a video chip set for creating the signals to form an image on a screen; some form of random access memory (RAM), such as EDO, SGRAM, SDRAM, DDR, VRAM, etc. as a frame buffer where the entire screen image is stored; and a display interface, such as a RAMDAC (digital/analog) through which signals are transmitted to be displayed on screen. The digital image transferred into RAM is often called a texture map, and is applied to some surface in the GPU's 3-D world. Preferably, the digital image is transferred into the GPU's dedicated high-speed video random access memory (VRAM). It is appreciated that VRAM is fast memory designed for storing the image to be displayed on a computer's monitor. VRAM may be built from special memory integrated circuits designed to be accessed sequentially. The VRAM may be dual ported in order to allow the display electronics and the CPU to access it at the same time.

Perhaps one downside of using GPUs, however, directly relates to the relative immaturity of available low-level development/coding tools (assembly level). To achieve high-performance custom code, GPUs must be programmed in assembly language without the availability of debuggers. Fortunately, high-level application programming interfaces (APIs) to the GPU are provided by the manufacturers of COTS video cards. Using languages, such as for example OpenGL and DirectX, the vast majority of complex 3-D operations are performed transparently in the graphics subsystem hardware so that outputs are fully defined, known, and predictable given a set of inputs. At the high-level API, 3-D perspective transformations make use of homogeneous coordinates, as suggested in *OpenGL Programming Guide*, Third Edition, Addison Wesley, 1999, Appendix F (pp 669-674). In this system, all coordinates are scale-invariant:

$$\begin{bmatrix} x \\ y \\ z \\ w \end{bmatrix} \equiv \begin{bmatrix} ax \\ ay \\ az \\ aw \end{bmatrix} \quad (13)$$

and can be used to represent scaled coordinates in 3-D:

$$\text{Homogeneous} \begin{bmatrix} x \\ y \\ z \\ w \end{bmatrix} \Leftrightarrow \begin{bmatrix} x/w \\ y/w \\ z/w \end{bmatrix} \text{3-D World} \quad (14)$$

A completely general affine transform in homogeneous coordinates may thus be implemented via a vector-matrix multiplication:

$$\begin{bmatrix} x' \\ y' \\ z' \\ w' \end{bmatrix} = \begin{bmatrix} m_0 & m_4 & m_8 & m_{12} \\ m_1 & m_5 & m_9 & m_{13} \\ m_2 & m_6 & m_{10} & m_{14} \\ m_3 & m_7 & m_{11} & m_{15} \end{bmatrix} \cdot \begin{bmatrix} x \\ y \\ z \\ w \end{bmatrix} \quad (15)$$

where the matrix with elements $m_0$-$m_{15}$ is an identity matrix. In order to implement Equations 8 and 12, a geo-registration matrix is constructed by scaling three elements of an identity matrix as follows:

$$m_0 = -\frac{D}{f}; \quad m_5 = -\frac{D^2}{Zf}; \quad m_7 = -\frac{G}{Zf} \quad (16)$$

and setting a zero value or a value of 1 for the remaining elements of the identity matrix, as follows:

$$m_{1,2,3,4,6,7,8,9,11,112,13,14} = 0, \quad m_{10,15} = 1 \quad (17)$$

C. Operation of Geo-Registration Method Using COTS GPU

Figure 6:
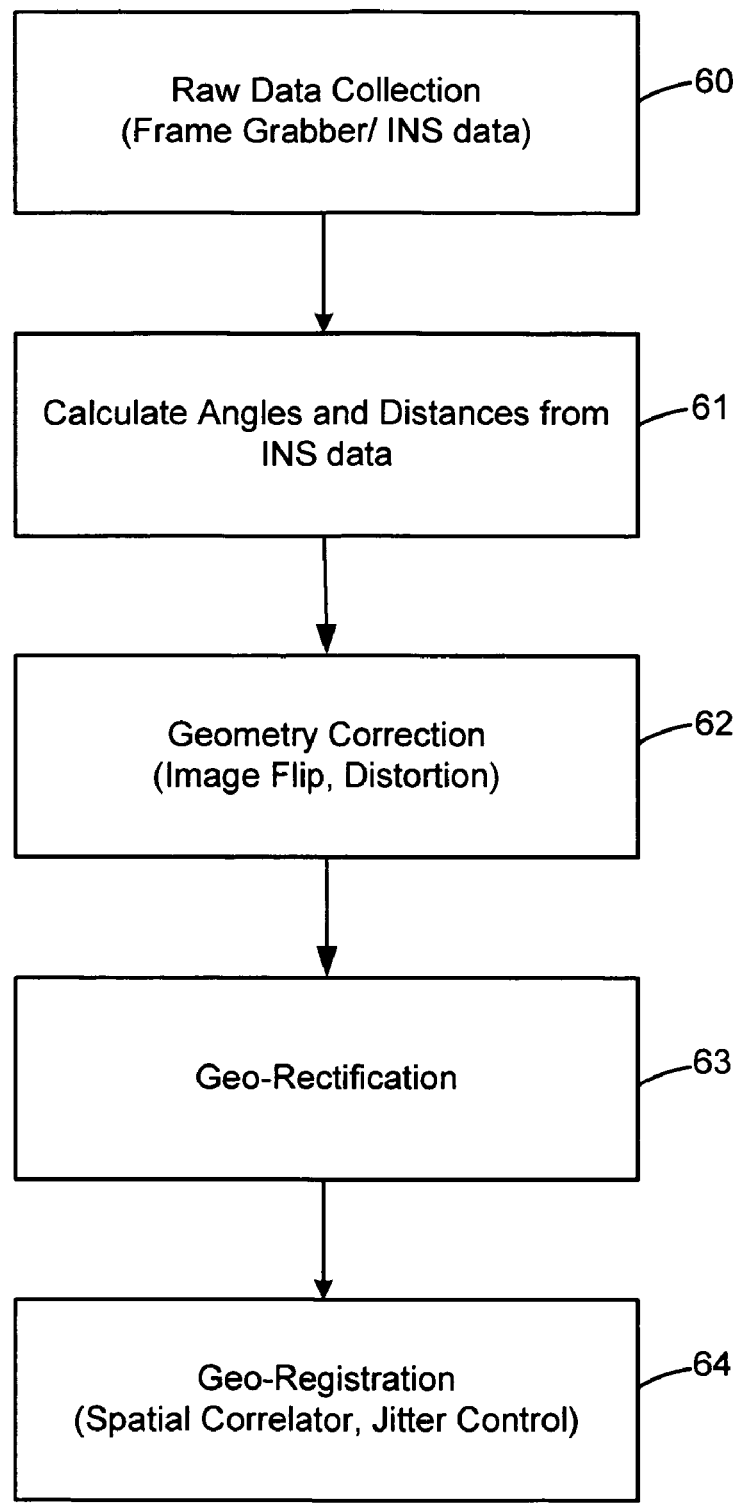
FIG. 6 is a general flowchart of the geo-registration method of a preferred embodiment of the present invention.

FIG. 6 shows a generalized flowchart of the geo-registration algorithm of the present invention based on camera location, camera attitude, and optical system characteristics. First a source image is obtained along with INS data, as indicated at block 60, via the optical imaging (camera) platform and INS. Then the angles and distances, such as for example Z, D, G, f, $\alpha_{pitch}$ are calculated from INS data at block 61. It is appreciated that depending on which method induces the least error, D and G may be calculated directly from Z and $\alpha_{pitch}$ (via trigonometric relations) or by other means, such as GPS position data. Geometry correction of the image is then performed, such as image flipping and distortion correction at block 62. Geo-rectification is then performed at block 63 by mapping perspective equations to a homogeneous coordinate transformation using the earlier calculated values (e.g. Z, D, G, f) as discussed with respect to Equation 16, and propagating source pixels produced from the coordinate transformation to an output image plane. At this point, interpolation and anti-aliasing may be performed, and blank patches may be filled-in. And finally, geo-registration is performed at block 64 to register (or spatially correlate) the geo-rectified image to a known target or previous imagery. Preferably, the registration region is rendered by reading pixels, performing correlation on the CPU and providing feedback shifts to the transformation matrix to shift the result to sub-pixel resolution and thereby remove jitter caused by GPS uncertainty or IMU drift. And the entire transformed image is rendered onscreen. In the present invention, blocks 61-64 are preferably performed by a conventional GPU in a PC to realize the benefits previously described.

Figure 7:
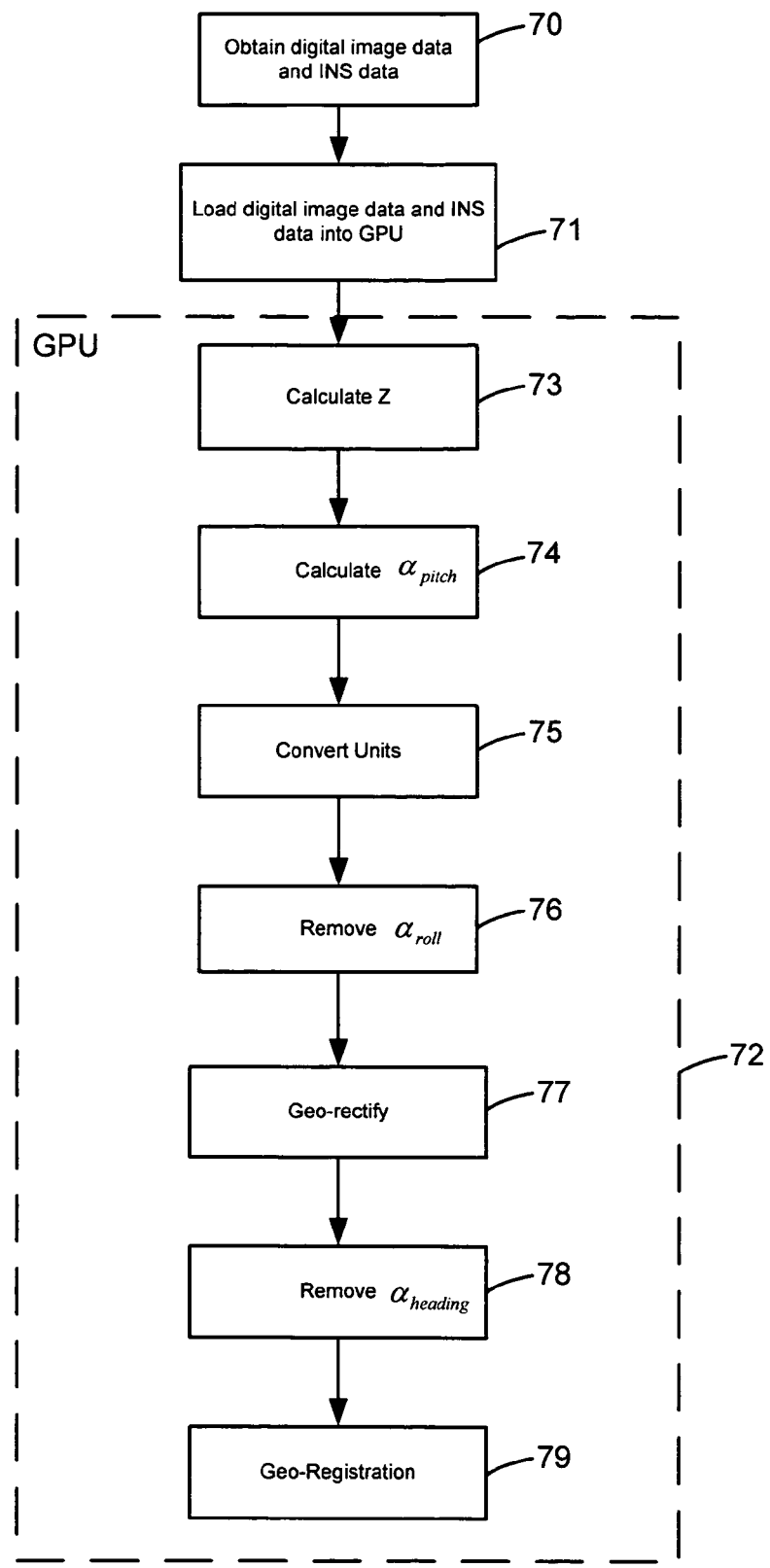
FIG. 7 is a detailed flowchart of the geo-registration method of a preferred embodiment of the present invention showing the specific operations performed by the GPU.

FIG. 7 shows a more detailed flow chart of a preferred embodiment of the present invention, illustrating the transfer of the digital image data into the GPU and the specific steps performed thereby. As shown at block 70, digital image data and INS data are first obtained as previously discussed. At block 71, the digital source image data and INS data are moved/loaded into a conventional GPU of a PC for image processing. Subsequent processing steps 73-79 are shown inside region 72 as being steps performed by the GPU. Preferably the image is loaded into the GPU's dedicated high-speed VRAM of the GPU as a texture map applied to some surface in the GPU's 3-D world.

Blocks 73 and 74 represent two calculations steps which are based on GPS position data obtained by the GPS locator. In particular, the relative altitude, Z, of the camera is calculated with respect to the CFOV at block 73, and the pitch angle, $\alpha_{pitch}$, is calculated at block 74. Depending on the INS's coordinate transformation model, the calculation of $\alpha_{pitch}$ may be a simple substitution or require a complex set of trigonometric calculations involving heading, pitch, and roll.

Since it is unlikely that the GPU's 3D world, GPS coordinates, pixel spacing, etc. will have identical measurement units, block 75 shows the step of converting units, which may be considered a part of the geometry correction step 62 of FIG. 6, This potential problem can be addressed by using a scaling transformation matrix for unit conversion. It is notable, however, that care must be taken when operating on numbers of vastly different orders-of-magnitude. The high-level language may use double precision floating-point, but current GPUs typically only support 16 or 24-bit numbers. Thus in the alternative, unit conversion scaling may be propagated into the geo-rectification transformation matrix of equations Another aspect of the geometry correction step includes removing the roll, $\alpha_{roll}$, of the camera at block 75, i.e. offsetting any angular deviation from a reference direction caused by rotation of the camera about the optical axis. This is accomplished by performing a rotation transformation on the source image.

Geo-rectification is then performed at block 77 by calculating $m_0$, $m_5$, and $m_7$ from the previously calculated values for Z, D, G, and f, and calculating the transformation matrix of equations (16) and (17) above, to produce a geo-rectified image.

At block 78, the heading angle, $\alpha_{heading}$, is removed to offset and adjust for any angular deviation from a reference direction. This is accomplished by performing a rotation transformation about the z-axis of the geo-rectified image such that the result is oriented with a reference direction as 'up' (such as North). Similar to the removal of the pitch angle, the heading angle, $\alpha_{heading}$, may involve a transformation from the INS unit's coordinate system.

And in block 79, geo-registration is performed for spatial correlation, and a registration region is rendered. It is notable that this step is highly sensitive to errors in the determination of $\alpha_{pitch}$. On the scale of most geo-registration applications, the uncertainty in position of GPS (<10 m) has very little effect on the calculation results. Unfortunately, this cannot be said for the angular data. Depending on the INS hardware, heading may drift up to several degrees per hour. Even so, as long as Z>>f; the result of small angular errors is a transverse offset in the resulting geo-rectified image. Correlation, or more sophisticated morphological techniques may be required to stabilize the imagery to a reference position. Note that GPUs are very efficient at translating an image and can automatically perform the anti-aliasing required for non-integer shifts.

Thus, when performing the geo-registration step, a preferred embodiment of the invention additionally provides jitter control of the generated image. In this enhancement, a small segment of the image is geo-registered, and after a process involving Fourier transforms and inverse transforms of two image segments, the position of the correlation "peak" (i.e. the point of highest intensity light) in the resulting image is discerned. This identifies the appropriate relative positions of the two images, as a relative position shift. This relative position shift is then applied as part of a geo-registration of the complete image. The advantage of this approach is that the jittering of an image can be stabilized far more quickly than if the correlation technique had been applied to the entire image.

Additionally, while the method of the present invention may assume a flat-earth model (as previously discussed) it may also, in the alternative, incorporate digital elevation maps (DEMs) (which are available for much of the earth's surface) into the image projection process by 'draping' the texture map (source image data) over a 3-D surface built from DEM data.

D. Example Software Implementation

The procedure outlined in the previous section C. has been implemented by Applicants in an exemplary embodiment using a custom MacOS X application for the user interface, and OpenGL for the GPU code, collectively the "software." FIG. 7 shows a screen shot showing a snippet of exemplary source code of the software representing the display routine used by OpenGL to perform the steps discussed above for geo-rectification. The signs of $m_5$ and $m_7$ are opposite to that described in Equation 16 due to the coordinate system of the texture map. Algebraic manipulation of $m_5$ leads to an alternate equation, namely:

$$m_5 = \left(Z + \frac{G^2}{Z}\right)\frac{1}{f}. \quad (18)$$

Figure 9:
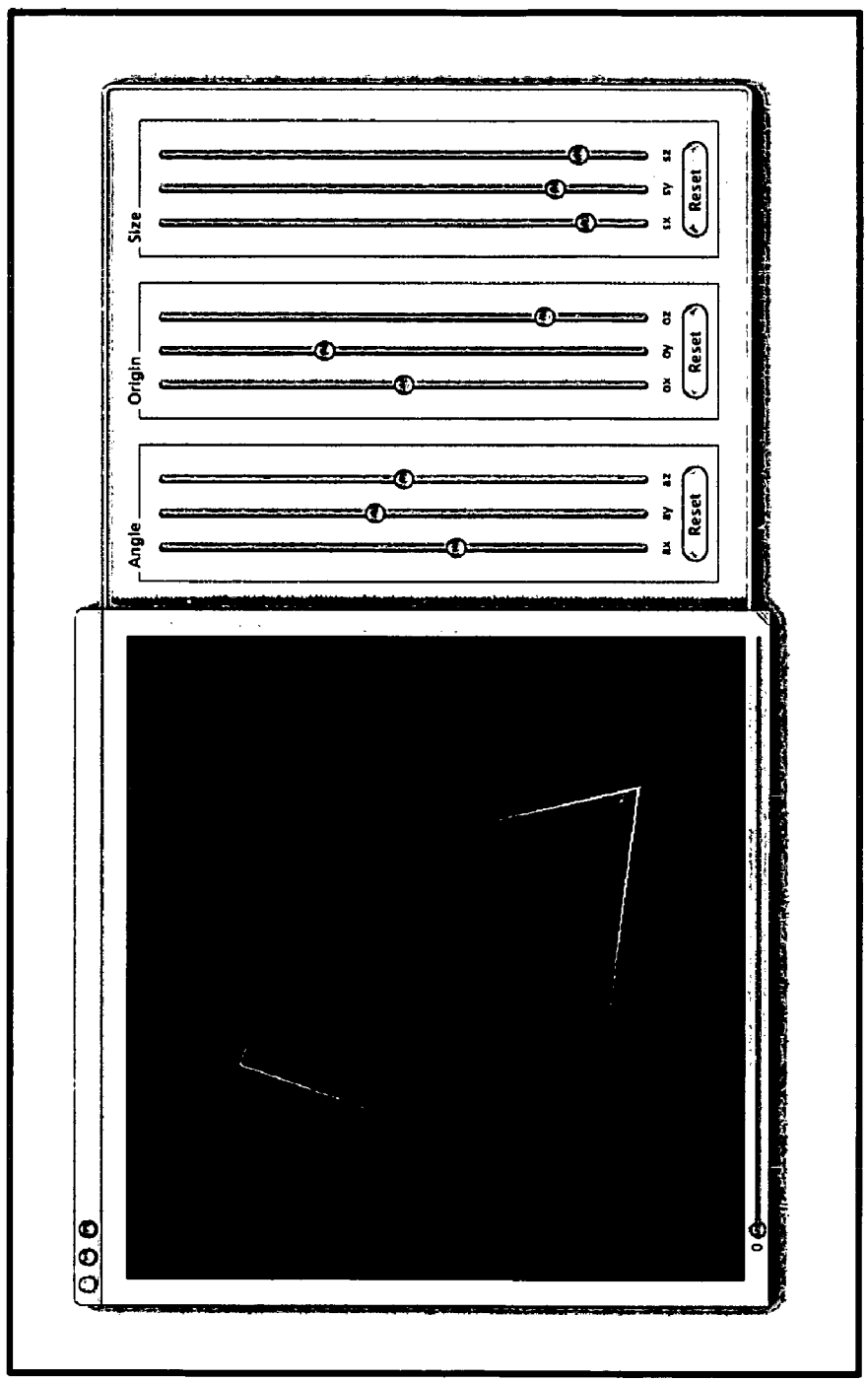
FIG. 9 is a screen shot showing the transformation of a colored square using an exemplary embodiment of the present invention.
Figure 10:
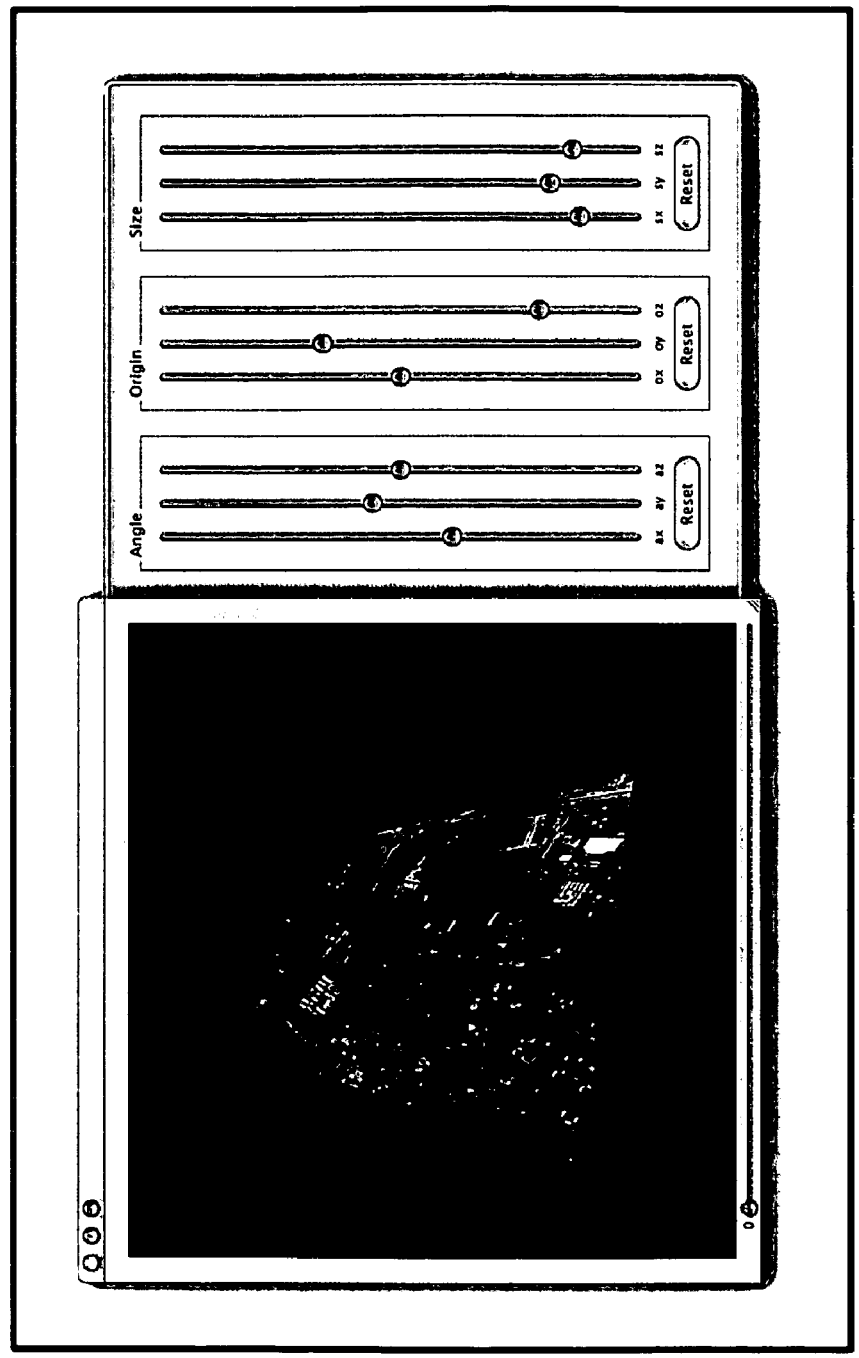
FIG. 10 is a screen shot showing the transformation of a texture-mapped square using an exemplary embodiment of the present invention.

FIGS. 8-12 show various screen shots produced in real time by the software using raw data including camera position, attitude, and optical system characteristics. In particular, FIGS. 8 and 9 show screen shots of a colored square and a texture-mapped square, respectively, along with the onscreen controls for graphically transforming the images. FIG. 10 shows an "experiment view" mode in the software, using INS data a optical system characteristics to create the flight pattern of a mobile camera platform (e.g. an aircraft) carrying the camera system. FIG. 11 is an exemplary screen shot of a source image prior to geo-rectification and geo-registration, along with the onscreen controls and view parameters. And FIG. 12 is an exemplary screen shot of a geo-rectified and geo-registered image following FIG. 11. It is appreciated that the square shape of the projected image produced by the software in FIG. 11 indicates that the imaged source region should have a symmetric trapezoidal geometry, as previously discussed. This is shown in FIG. 12 where the transformed image (after geo-rectification and geo-registration by the software) reflects the true shape and boundaries of the region captured in the image. Furthermore, controls are provided on screen so that the output resolution [m/pixel] is user adjustable.

When used to process sample mobile-platform imagery recorded with corresponding INS data, the software has been shown to process 4 Mpixel frames at over 10 Hz on an 800 MHz PowerBook G4. In contrast, geo-registration of the identical image data performed by custom software on a 2 GHz-class Pentium 4 system required approximately 15 seconds to process each 4 Mpixel frame. Thus the method of the present invention has been shown to work very well even on mid-range GPUs. However, where the technique of the present invention out-performs custom hardware solutions is in the area of high-resolution digital imagery. It is appreciated that the ultimate limitations of size/speed will be determined by both the amount of VRAM of the GPU, and the bandwidth of the graphics card-to-PC motherboard interface. Rendering time is itself not a limitation, since texture mapping and transforming a single quadrilateral is naught for GPUs designed to process millions of triangles per second. Current GPUs typically have up to 64 MB of VRAM (some high-end cards now have up to 256 MB), which must be shared between the screen's frame buffer, texture maps, and other 3-D objects. Since this technique renders directly to the video buffer, output resolutions will be limited to the maximum frame buffer size allowed by the graphics card. Higher resolutions may be achieved by 'stitching' individual geo-rectifications together. For large, multi-MB images, the most critical times are those of moving the source data from the PC's main memory into the VRAM, processing to the frame buffer, and then reading the result back out. The advanced graphics port (AGP) interface is used for most graphics cards/PC motherboards. The current 3.0 version (a.k.a. AGP 8x as suggested on the Intel AGP website: www.intel.com/support/graphics) supports transfers up to 2 GB/sec, and unlike in previous versions, the bandwidth is symmetrical for reading and writing data. Nevertheless, if additional processing on the transformed imagery is required, it is extremely advantageous to leave it in the graphics card's VRAM and perform the calculations with the GPU. Depending on the algorithm, this may or may not be possible.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. A geo-registration method comprising:
obtaining digital image data of an image source using a camera located a distance D from a center field of view (CFOV) of the image source, where f is the focal length of a lens of the camera and D>>f;
obtaining inertial navigation system (INS) data of the camera associated with the digital image data, said INS data including camera position data and camera attitude data including roll ($\alpha_{roll}$), pitch ($\alpha_{pitch}$), and heading ($\alpha_{heading}$);
loading the digital image data into a graphics processing unit (GPU) of a computer system to be processed thereby;
in the GPU of the computer system:
calculating relative angles and distances between the camera and the image source from said INS data;
performing geometry correction of the digital image data using the calculated relative angles and distances;
performing geo-rectification of the geometrically corrected digital image data using an affine homogenous coordinate transformation, to produce a geo-rectified digital image data;
performing heading adjustment by performing a rotation transformation about a z-axis of the geo-rectified digital image data to remove the $\alpha_{heading}$; and
performing geo-registration with the heading-adjusted and geo-rectified digital image data.

2. The geo-registration method of claim 1,
wherein the step of calculating relative angles and distances includes calculating the relative altitude, Z, of the camera with respect to the CFOV, and the $\alpha_{pitch}$ of the camera.

3. The geo-registration method of claim 1,
wherein the step of performing geometry correction includes converting measurement units into uniform units of measure.

4. The geo-registration method of claim 1,
wherein the step of performing geometry correction includes performing a rotation transformation on the digital image data to offset any value of the $\alpha_{roll}$ about the optical axis.

5. The geo-registration method of claim 1,
wherein an affine homogenous coordinate transformation equation is represented by:

$$\begin{bmatrix} x' \\ y' \\ z' \\ w' \end{bmatrix} = \begin{bmatrix} m_0 & m_4 & m_8 & m_{12} \\ m_1 & m_5 & m_9 & m_{13} \\ m_2 & m_6 & m_{10} & m_{14} \\ m_3 & m_7 & m_{11} & m_{15} \end{bmatrix} \cdot \begin{bmatrix} x \\ y \\ z \\ w \end{bmatrix}$$

with $$m_0 = -\frac{D}{f};\ m_5 = -\frac{D^2}{Zf};\ m_7 = -\frac{G}{Zf},\ m_{1,2,3,4,6,7,8,9,11,112,13,14} = 0,$$

and $$m_{10,15} = 1,$$

wherein $m_0$-$m_{15}$ are elements of an identity matrix, G is a point on a ground plane, and Z is the relative altitude.

6. The geo-registration method of claim 1, wherein the step of loading the digital image data into the GPU includes transferring the digital image data into high-speed video random-access memory (VRAM) of the GPU.

7. The geo-registration method of claim 1, wherein the step of performing geo-registration includes removing jitter due to INS data uncertainty by:
  geo-registering a small segment of the heading-adjusted and geo-rectified digital image data;
  performing Fourier transform and inverse transform of two image segments;
  determining a position of a correlation peak having the highest intensity light which identifies the appropriate relative positions of the two images; and
  applying the relative position shift as part of the geo-registration step of the complete image.

8. The geo-registration method of claim 1, wherein
  the step of calculating relative angles and distances includes calculating the relative altitude, Z, of the camera with respect to the CFOV, and calculating relative angles and distances includes calculating the $\alpha_{pitch}$ of the camera;
  the step of performing geometry correction includes converting measurement units into uniform units of measure;
  the step of performing geometry correction includes performing a rotation transformation on the digital image data to offset any value of the $\alpha_{roll}$ about the optical axis; and
  an affine homogenous coordinate transformation equation is represented by:

$$\begin{bmatrix} x' \\ y' \\ z' \\ w' \end{bmatrix} = \begin{bmatrix} m_0 & m_4 & m_8 & m_{12} \\ m_1 & m_5 & m_9 & m_{13} \\ m_2 & m_6 & m_{10} & m_{14} \\ m_3 & m_7 & m_{11} & m_{15} \end{bmatrix} \cdot \begin{bmatrix} x \\ y \\ z \\ w \end{bmatrix}$$

with $$m_0 = -\frac{D}{f};\ m_5 = -\frac{D^2}{Zf};\ m_7 = -\frac{G}{Zf},\ m_{1,2,3,4,6,7,8,9,11,112,13,14} = 0,$$

and $$m_{10,15} = 1,$$

wherein $m_0$-$m_{15}$ are elements of an identity matrix, G is a point on a ground plane, and Z is the relative altitude.

9. The geo-registration method of claim 8, wherein the step of converting measurement units includes using a scaling transformation matrix.

10. The geo-registration method of claim 8, wherein the step of performing geo-rectification includes calculating D and G from Z and the $\alpha_{pitch}$.

11. The geo-registration method of claim 8, wherein the step of performing geo-rectification includes calculating D and G from the camera position data.

12. The geo-registration method of claim 8, wherein the step of loading the digital image data into the GPU includes transferring the digital image data into high-speed video random-access memory (VRAM) of the GPU.

13. The geo-registration method of claim 8, wherein the step of performing geo-registration includes removing jitter due to INS data uncertainty by:
  geo-registering a small segment of the heading-adjusted and geo-rectified digital image data;
  performing Fourier transform and inverse transform of two image segments;
  determining a position of a correlation peak having the highest intensity light which identifies the appropriate relative positions of the two images; and
  applying the relative position shift as part of the geo-registration step of the complete image.

14. An article of manufacture comprising:
  a computer usable medium having computer readable program code embodied therein for geo-registering digital image data of an image source using a graphics processing unit (GPU) of a computer, said digital image data obtained using a camera located a distance D from a center field of view (CFOV) of the image source, where f is the focal length of a lens of the camera and D>>f, and said digital image data associated with inertial navigation system (INS) data of the camera including camera position data and camera attitude data, the computer readable program code in said article of manufacture comprising:
  computer readable program code for causing the GPU to calculate relative angles and distances between the camera and the image source from said INS data;
  computer readable program code for causing the GPU to perform geometry correction of the digital image data using the calculated relative angles and distances;
  computer readable program code for causing the GPU to perform geo-rectification of the geometrically corrected digital image data using an affine homogenous coordinate transformation, to produce a geo-rectified digital image data;
  computer readable program code for causing the GPU to perform heading adjustment by performing a rotation transformation about a z-axis of the geo-rectified digital image data to remove a heading angle ($\alpha_{heading}$); and
  computer readable program code means for causing the GPU to perform geo-registration with the heading-adjusted and geo-rectified digital image data.

15. The article of manufacture of claim 14, wherein
  the computer readable program code for causing the GPU to calculate relative angles and distances between the camera and the image source includes computer readable program code for causing the GPU to calculate the relative altitude, Z, of the camera with respect to the CFOV, and calculate a pitch angle ($\alpha_{pitch}$) of the camera;
  the computer readable program code for causing the GPU to perform geometry correction includes computer readable program code for causing the GPU to convert measurement units into uniform units of measure;

the computer readable program code for causing the GPU to perform geometry correction includes computer readable program code for causing the GPU to perform a rotation transformation on the digital image data to offset any roll ($\alpha_{roll}$) about the optical axis; and an affine homogenous coordinate transformation equation is represented by:

$$\begin{bmatrix} x' \\ y' \\ z' \\ w' \end{bmatrix} = \begin{bmatrix} m_0 & m_4 & m_8 & m_{12} \\ m_1 & m_5 & m_9 & m_{13} \\ m_2 & m_6 & m_{10} & m_{14} \\ m_3 & m_7 & m_{11} & m_{15} \end{bmatrix} \cdot \begin{bmatrix} x \\ y \\ z \\ w \end{bmatrix}$$

with $$m_0 = -\frac{D}{f}; m_5 = -\frac{D^2}{Zf}; m_7 = -\frac{G}{Zf}, m_{1,2,3,4,6,7,8,9,11,112,13,14} = 0,$$

and $$m_{10,15} = 1,$$

wherein $m_0$-$m_{15}$ are elements of an identity matrix, and G is a point on a ground plane.

16. The article of manufacture of claim 15, wherein the computer readable program code for causing the GPU to perform geo-registration with the heading-adjusted and geo-rectified digital image data includes computer readable program code for causing the GPU to remove jitter due to INS data uncertainty by geo-registering a small segment of the heading-adjusted and geo-rectified digital image data; performing Fourier transform and inverse transform of two image segments; determining a position of a correlation peak having the highest intensity light which identifies the appropriate relative positions of the two images; and applying the relative position shift as part of the geo-registration step of the complete image.

* * * * *